United States Patent
Eichler

(10) Patent No.: US 10,352,295 B2
(45) Date of Patent: Jul. 16, 2019

(54) DIRECT MOLD FOR ROTOR BLADES FOR WIND TURBINES

(71) Applicant: Senvion SE, Hamburg (DE)

(72) Inventor: Karl Eichler, Westerronfeld (DE)

(73) Assignee: Senvion SE, Hamburg (DE)

( * ) Notice: Subject to any disclaimer, the term of this patent is extended or adjusted under 35 U.S.C. 154(b) by 1210 days.

(21) Appl. No.: 14/457,543

(22) Filed: Aug. 12, 2014

(65) Prior Publication Data

US 2014/0345789 A1    Nov. 27, 2014

Related U.S. Application Data

(63) Continuation of application No. PCT/EP2013/000298, filed on Jan. 31, 2013.

(30) Foreign Application Priority Data

Feb. 16, 2012   (DE) .......................... 10 2012 202 376

(51) Int. Cl.
    *F03D 1/06*    (2006.01)
    *B29C 70/02*   (2006.01)
    (Continued)

(52) U.S. Cl.
    CPC .............. *F03D 1/065* (2013.01); *B29C 33/02* (2013.01); *B29C 70/021* (2013.01);
    (Continued)

(58) Field of Classification Search
    CPC ..... B29C 33/307; B29C 33/02; B29C 70/021; F03D 1/065
    See application file for complete search history.

(56) References Cited

U.S. PATENT DOCUMENTS

| | | |
|---|---|---|
| 2009/0084932 A1 | 4/2009 | Livingston |
| 2013/0164124 A1* | 6/2013 | Ohtachi ............... F04D 19/042 |
| | | 415/183 |

FOREIGN PATENT DOCUMENTS

| | | |
|---|---|---|
| DE | 10 2008 044 530 | 4/2009 |
| FR | 2 598 648 | 11/1987 |

(Continued)

OTHER PUBLICATIONS

International Search Report for Application No. PCT/2013/000298 dated Jul. 26, 2013; English Translation included.

(Continued)

*Primary Examiner* — Philip C Tucker
*Assistant Examiner* — John Blades
(74) *Attorney, Agent, or Firm* — Rankin, Hill & Clark LLP

(57) ABSTRACT

A direct mold includes a plank frame and a mold surface body held in shape by the plank frame. The plank frame is made of a plurality of planar panels that are aligned transversely to the longitudinal extension of the rotor blade and are arranged spaced with respect to each other in the direction of the longitudinal extension of the rotor blade. The panels of the plank frame have recesses, into which the mold surface body is inserted and which reproduces in its sequence in the plank frame mainly a progression of a contour of a part of a rotor blade profile. The mold surface body has a layer structure that includes a support layer and a sandwich layer. The support layer is made of rails that are aligned in the longitudinal direction of the rotor blade in a manner bridging the distances between the panels.

12 Claims, 7 Drawing Sheets

(51) Int. Cl.
  *B29D 99/00* (2010.01)
  *B29C 33/02* (2006.01)
  *B29L 31/08* (2006.01)
  *B29C 33/30* (2006.01)
  *B29C 33/38* (2006.01)

(52) U.S. Cl.
  CPC ........ *B29D 99/0025* (2013.01); *B29C 33/307* (2013.01); *B29C 33/38* (2013.01); *B29L 2031/08* (2013.01); *B29L 2031/085* (2013.01); *Y02E 10/721* (2013.01); *Y02P 70/523* (2015.11); *Y10T 156/1028* (2015.01)

(56) References Cited

FOREIGN PATENT DOCUMENTS

| FR | 2598648 | * 11/1987 | ............. B21D 49/00 |
|----|---------|-----------|--------------------------|
| WO | 2011/029276 | 3/2011 | |
| WO | 2011/096861 | 8/2011 | |

OTHER PUBLICATIONS

Dorworth, Louis C. "Composite Tooling", Dec. 1, 2001, pp. 434-440, ASM International, USA.
Ridgard, C., "Low Temperature Curing Prepreg Systems for High Temperature Resistant, High Performance Composite Mould Tools and Components", Jan. 1, 1989, pp. 1-15, vol. 2, No. 1, Composites Polymers, Rapra Technology, Shawbury, Shrewsbury, GB.
Marsh et al, "What are the tools of the blade trade?", Renewable Energy Focus, Sep. 1, 2008, pp. 52-54, 56, vol. 9, No. 5.

* cited by examiner

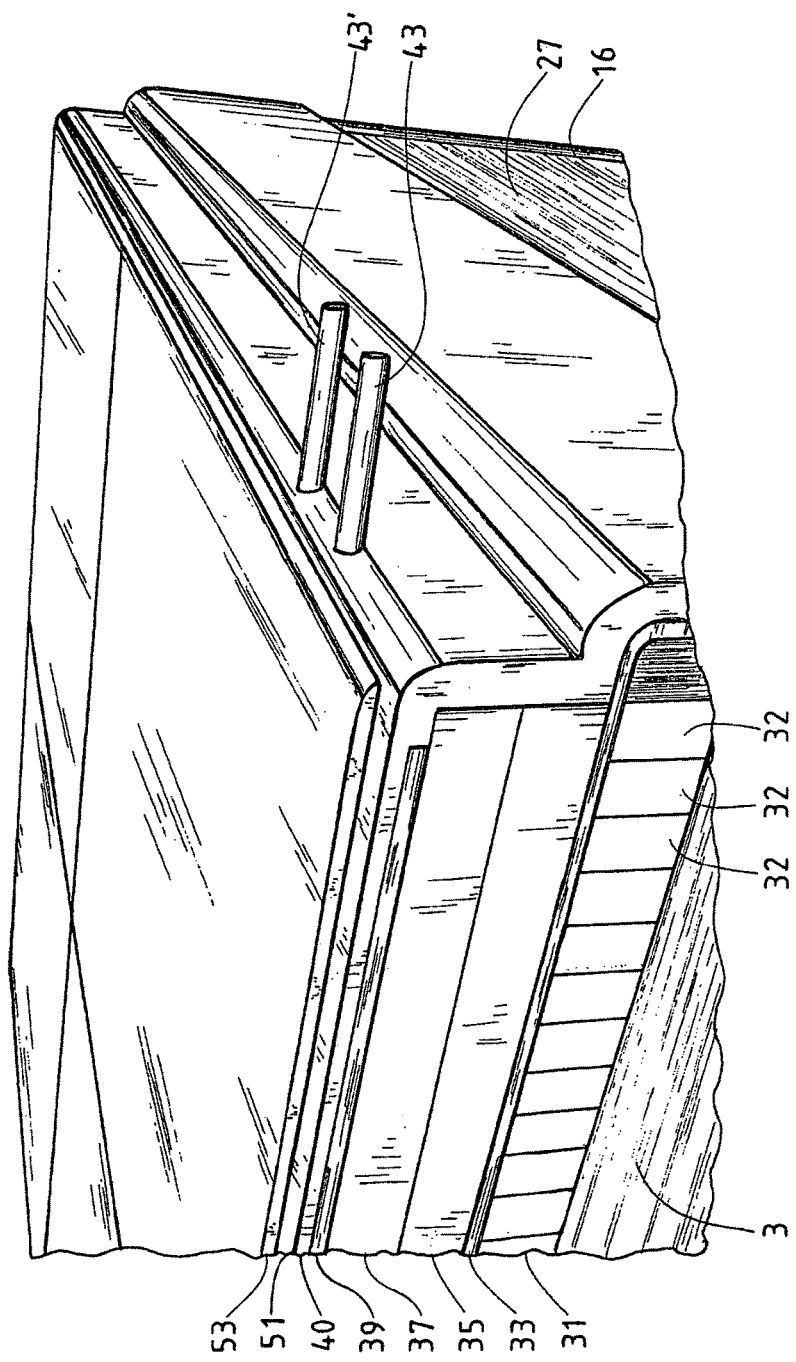

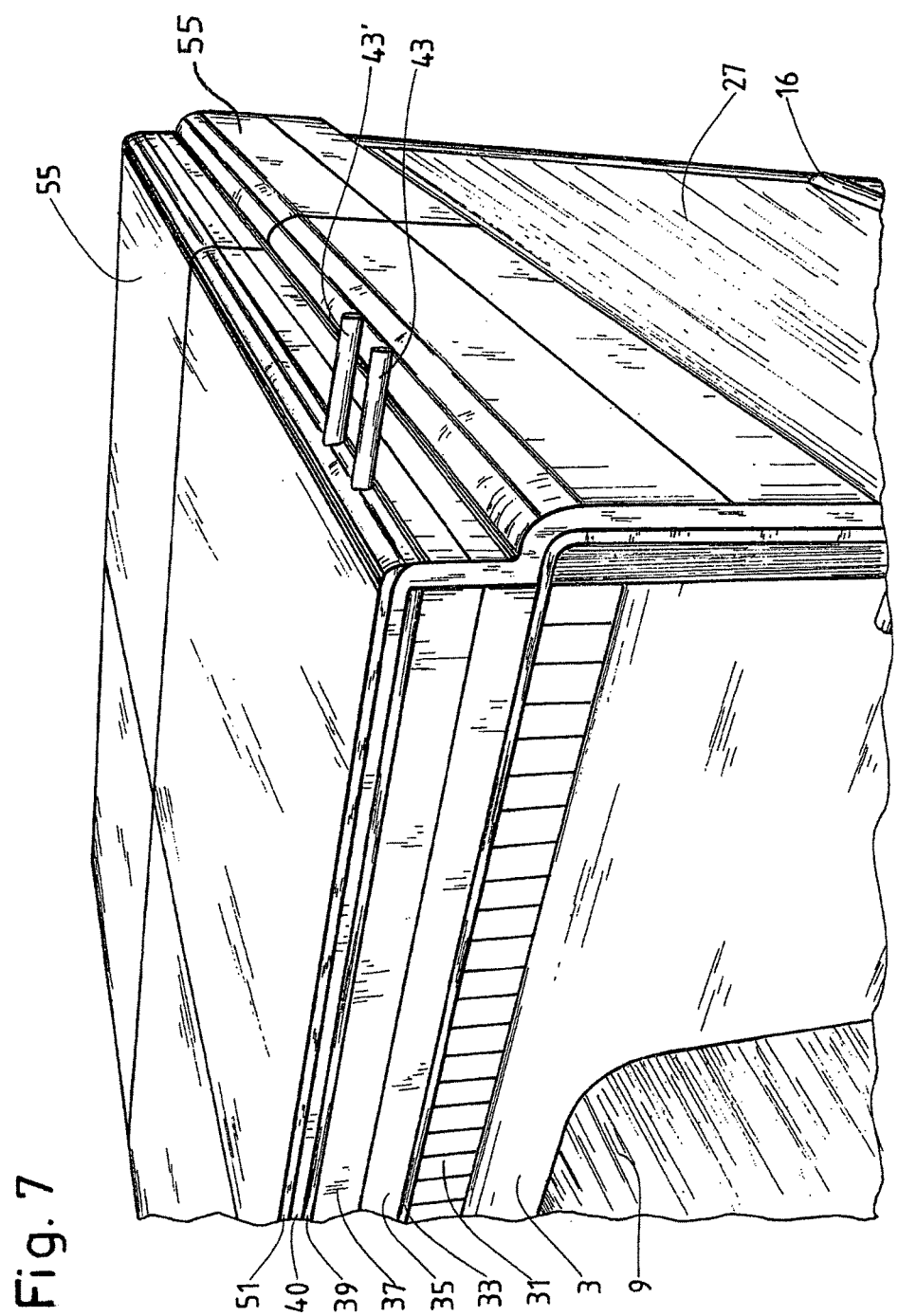

DIRECT MOLD FOR ROTOR BLADES FOR WIND TURBINES

BACKGROUND OF THE INVENTION

Field of the Invention

The invention relates to a direct mold for rotor blades for wind turbines, components of rotor blades or rotor blade segments, a use of a direct mold and a method for producing a direct mold for rotor blades for wind turbines, components of rotor blades or rotor blade segments.

Description of Related Art

Rotor blades of wind turbines are generally first designed on a computer and optimized with respect to their aerodynamic and mechanical properties in the computer model before a master model of a rotor blade is produced, from which then an impression is taken, which is used to produce a mold for the rotor blade or for parts of the rotor blade. This procedure is time- and cost-intensive and does not allow much leeway for later changes in the design of the rotor blade. If it is for example determined that the rotor blades to be produced or already produced still require revision in some areas, then this assumes either the creation of a new master model or at least the reworking of master model and the production of a new mold.

BRIEF SUMMARY OF THE INVENTION

In contrast to this, the object of the present invention is to accelerate and simplify the development and production of rotor blades and also the revision of rotor blade designs as well as to design them in a more cost-effective manner.

This object is solved by a direct mold for rotor blades for wind turbines, components of rotor blades or rotor blade segments, comprising a plank frame and a mold surface body held in shape by the plank frame, wherein the plank frame is made of a plurality of planar panels, which are aligned transversely to the longitudinal extension of the rotor blade and are arranged spaced with respect to each other one after another in the direction of the longitudinal extension of the rotor blade. The panels of the plank frame have recesses, into which the mold surface body is inserted and which reproduce in their sequence in the plank frame mainly a progression of a contour of a part of a rotor blade profile. The mold surface body has a layer structure, which comprises a support layer and a sandwich layer. The support layer is made of rails, which are aligned in the longitudinal direction of the rotor blade in a manner bridging the distances between the panels. The sandwich layer arranged on the support layer comprises a multi-layer laminate structure, the surface of which is milled and/or painted and has the contour of a part of a rotor blade to be produced. Within the context of the invention, such a part of a rotor blade can be, for example, a half shell or a shell segment.

The thereby realized concept of the use of a direct mold accelerates the production of a new rotor blade by five to six months since a master model no longer needs to be produced. Rotor blade molds are available more quickly so that a rotor blade prototype is available approximately six months earlier than to date. Moreover, the cost- and space-intensive later storage of a master model is omitted.

A corresponding direct mold is not used for the series production of rotor blades but can be used for 100 to 200 demoldings.

It is also easy to make changes to the rotor blade design with the direct mold, since in this case the corresponding panels can be easily revised or replaced, whereby a modified desired shape is predetermined for the mold surface body, which represents the actual mold. While the changes achievable in this manner are limited, based on experience, the changes to the rotor blade shape after the completion of the computer model are to an extent that they can generally be represented with the direct mold according to the invention.

The plank mold is intrinsically self-supporting and rigid. For this, the panels are preferably reinforced with at least one support arranged in the longitudinal direction of the rotor blade, which is designed in particular as a beam-like carbon support. The support(s) form the backbone of the plank frame and offer a simple option for reinforcing the panels of the plank frame.

The panels are preferably designed as composite-sandwich panels, which are segmented in particular for receiving the at least one support and are designed with recesses for the at least one support. Composite-sandwich panels have a core made of a stabilizing material, for example balsa wood, PET foam or PVC foam, which is laminated on one side or on both sides. A reinforcement of the lateral surfaces preferably takes place in that three supports are used, wherein two, in particular smaller, supports are arranged in the area of the leading edge and trailing edge of the profile.

The segmentation of the panels, which can also be called "planks," makes it possible to combine the structure of supports and panels into the plank frame structure, whereby an easy alignment of the panels also results.

Advantageously, the direct mold is arranged in a steel substructure. The steel substructure is lightweight and can hold the panels in position. The steel substructure can be used for different direct molds, since the panels of the plank frame can have a uniform size in their basic structure. The steel substructure also benefits the handling of the direct mold. The steel substructure is thereby considerably lighter than previous conventional steel frames for molds for rotor blades.

A particularly easy and quickly producible direct mold is preferably designed such that the sandwich layer only has a direct adhesive connection in the root area. "Root area" hereby means the root area of the rotor blade to be molded. At this position, the side walls are particularly steep and high since the root area has a round shape. Moreover, the root area does not generally experience reworking of the shape so that the sandwich layer in this area is also not subjected to changes and is thus fixed.

For example, PET rails or PVC rails are applied to the panels or respectively planks in a rail construction so that a base surface is created, which represent a later gliding structure and insulation. The sandwich layer or respectively the sandwich laminate is applied to this.

Preferably, a near-surface layer of the laminate structure is designed in a heatable manner, wherein the heatable layer is heatable by means of heating elements of a water heater, a carbon heater with carbon filaments and/or an electric heater laminated into the heatable layer. Instead of hot water, hot oil can also be fed through heating coils. A carbon heater has the advantage that the carbon filaments operated with direct current have the same thermal expansion coefficients as the materials surrounding the carbon filaments. The heatable layer is preferably an infusion laminate.

A heat-conducting structure, in particular a wire mesh, and/or temperature sensors is/are preferably embedded into or applied on the heatable layer of the laminate structure. A layer made of a plastic film with embedded pockets with silicon or a heat-conducting oil is also suitable as a heat-conducting structure.

The sandwich layer preferably has at least one reinforcing layer, preferably two, which comprises in particular PET foam, PVC foam or balsa wood and/or is in particular a good thermal insulator. The heat energy is thus preferably directed towards the rotor blade to be produced and is not lost to the outside. The mold is simultaneously further reinforced by the reinforcing layer, which can be several centimeters thick.

The last layer above the heatable layer is milled and/or painted in contour so that a specification-true mold is created. The coating of paint on the surface of the mold surface body preferably comprises a paint layer comprising polyurethane, vinylester, polyester, epoxy resin and/or PTFE and/or ceramic additives. These paints are particularly suitable for the production of rotor blades in the direct mold.

Rotor blade components or entire rotor blades can be produced with the direct mold. For this, the direct mold is preferably assembled or can be assembled from several direct mold segments. Individual parts, for example, of half shells of rotor blades can be produced by means of the segments of the direct mold. The direct mold segments can be produced in parallel, which further accelerates the production.

Several direct molds or respectively direct mold segments for individual rotor blade segments can be provided and these direct mold segments can be interconnected, which enables a modular construction of rotor blades in order to produce a rotor blade. Segmented direct molds are also easier to handle and transport than a one-piece direct mold.

With the direct mold according to the invention, potentially necessary contour changes to the blade geometry can be made before the series mold. Rotor blades can be built five to six months earlier than was possible to date. In return, development also has five to six months longer for structural development and design than to date. The series mold must only be built after a blade test is completed with positive results with a blade produced in the direct mold. Furthermore, a master model is not needed so that its later storage and associated costs are also omitted.

A later series mold can be built in this direct mold on a machine-reworked blade. For this, the inlaid blade is coated and milled. Thus, a master model is not necessary. The rotor blade replacing the master model can then be cleaned and reused.

The object underlying the invention is also solved by a use of a direct mold, in particular a direct mold described above according to the invention, for producing a rotor blade for wind turbines, a component of a rotor blade or a rotor blade segment.

The object underlying the invention is also solved by a method for producing a direct mold for rotor blades for wind turbines, components of rotor blades or rotor blade segments, in particular a direct mold described above according to the invention, which is characterized in that a plank frame made of a plurality of planar panels, which are aligned transversely to the longitudinal extension of the rotor blade and are arranged spaced with respect to each other one after another in the direction of the longitudinal extension of the rotor blade. A mold surface body is inserted into recesses of the panels, which reproduce in their sequence in the plank frame mainly a progression of a contour of a part of a rotor blade profile, which has a layer structure, which comprises a support layer and a sandwich layer. A support layer is first made of rails, which are aligned in the longitudinal direction of the rotor blade in a manner bridging the distances between the panels, onto which a sandwich layer with a multi-layer laminate structure is applied, the surface of which is milled and/or painted so that it has a contour of a rotor blade to be produced. This procedure is considerably faster than the conventional production of a master model, its demolding and production of the production mold.

The method is preferably developed further in that heating elements, a heat-conducting structure, in particular a wire mesh, and/or temperature sensors are laminated into and/or onto a near-surface layer during the buildup of the sandwich layer.

The properties, features and advantages named for the subjects of the invention, i.e. the direct mold, the use and the method, also apply without restriction to the respective other objects of the invention, which relate to each other.

Further features of the invention will become apparent from the description of embodiments according to the invention together with the claims and the included drawings. Embodiments according to the invention can fulfill individual features or a combination of several features.

BRIEF DESCRIPTION OF THE DRAWINGS

The invention is described below, without restricting the general idea of the invention, based on exemplary embodiments in reference to the drawings, whereby we expressly refer to the drawings with regard to the disclosure of all details according to the invention that are not explained in greater detail in the text. The figures show:

FIG. 6 is a perspective view of a simplified detail representation of a part of a direct mold according to the invention and FIG. 7 is a perspective view of a simplified representation of details of a direct mold according to the invention.

In the drawings, the same or similar types of elements and/or parts are provided with the same reference numbers so that a corresponding re-introduction is omitted.

DETAILED DESCRIPTION OF THE INVENTION

Figure 1:
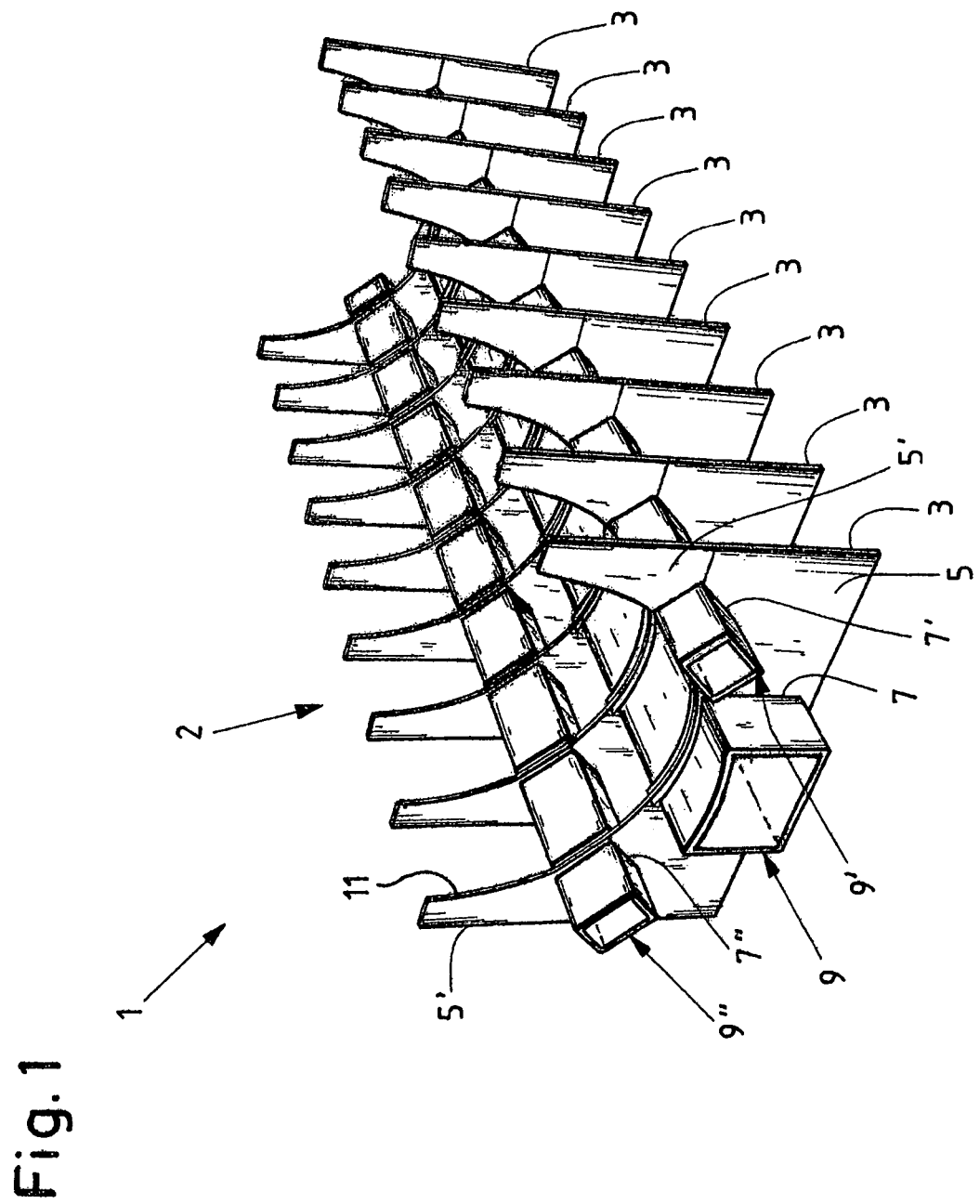
FIG. 1 is a perspective view of a plank frame.

FIG. 1 schematically shows a plank frame 2 of a part of a direct mold 1 according to the invention. The plank frame 2 comprises a series of panels 3, which are designed in a rectangular manner in the lower area and have a semi-circular recess or respectively inner contour 11 in the upper area. It thus concerns a part of a plank frame 2, which is designed for a root-side part of a rotor blade.

Each panel 3 comprises panel segments 5, 5', each of which are assembled into a panel 3. The segmentation serves to pull in or respectively inlay carbon supports 9, 9', 9" in the longitudinal direction of the rotor blade to be produced into the plank frame 2 for its stabilization. The segments 5, 5' of the panels 3 are interconnected after the inlay of the supports 9, 9', 9". The panels 3 are also called "planks." The supports 9, 9', 9" are arranged in recesses 7, 7', 7" of the panels 3.

In this manner, a self-supporting and rigid structure results.

Figure 2:
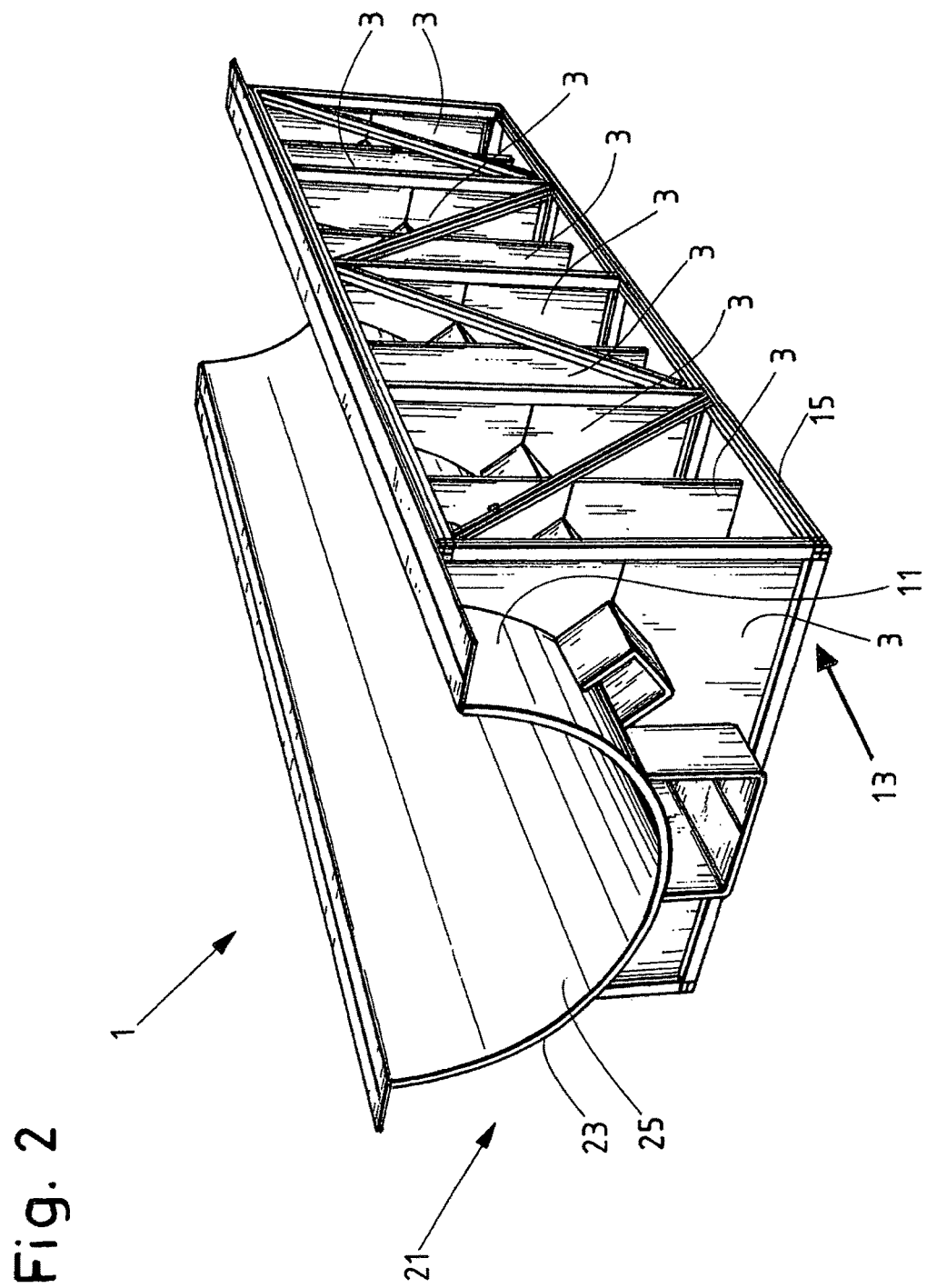
FIG. 2 is a perspective view of a part of a direct mold.

FIG. 2 shows how the plank frame 2 represented in FIG. 1 is inserted into a steel substructure 15, which aids in particular handling and transport. The steel substructure 15, which supports the foundation 13 of the plank frame, is lightweight and easy to handle.

FIG. 2 also shows that a semi-circular mold surface body 21 is embedded into the inner contour 11 of the panels 3, which represents the actual shape of the direct mold 1, since the laminate layers of the rotor blade to be produced are inlaid into the surface of the mold surface body 21. The mold surface body 21 has a layer structure 23, which is finished with a coating of paint 25. The coating of paint 25 is selected so that in particular an easy separation of the finished rotor blade is facilitated.

The mold surface body 21 provides the contour of the rotor blade section to be produced.

The panels 3 themselves are preferably made of a composite-sandwich structure and comprise as their core, for example, PET foam, PVC foam and/or balsa wood, wherein the core is enshrouded by a laminate structure.

The part shown in FIG. 2 can be a segment of a direct mold 1, which can be assembled with additional segments, which represent, for example, a middle and a blade-tip-side part of the direct mold.

With the direct mold shown in FIG. 2, a master model is no longer necessary.

Figure 3:
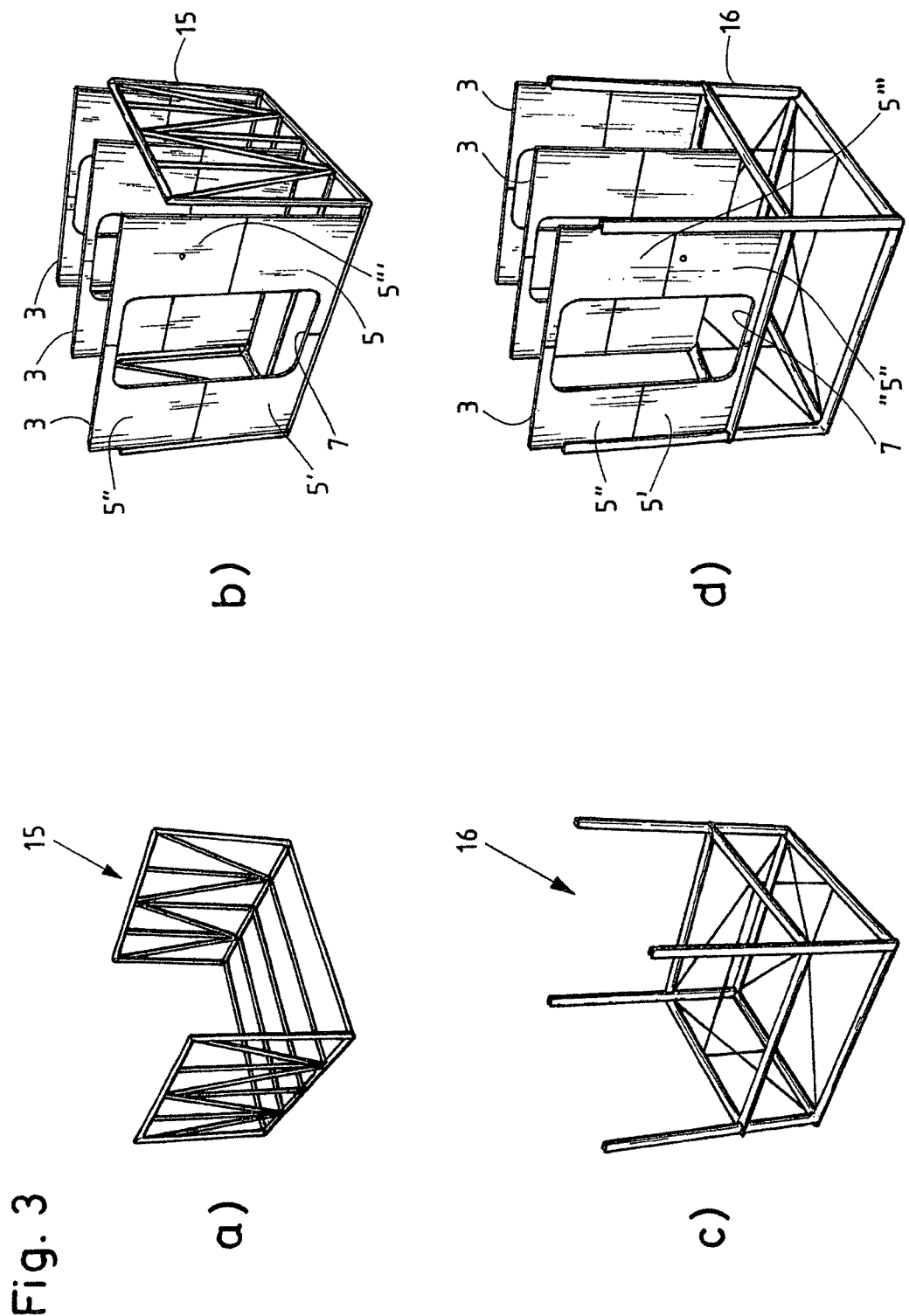
FIG. 3a-3d are perspective views of steel substructures.

A first example of a steel substructure 15 is shown in FIGS. 3a and 3b. This steel substructure 15, which is shown with embedded panels in FIG. 3b, has two lateral surfaces, which stabilize the structure to the side, in the manner of a guardrail.

The steel substructure 15 is U-shaped in cross-section.

The panels 3 shown in FIG. 3b in the steel substructure 15 are each made of four segments 5, 5', 5", 5''', which are assembled after a carbon support 9 (not shown) has been inserted.

FIGS. 3c and 3d show an alternative steel substructure 16 with and without panels 3, which is assembled from tubes. The undersurface is held by tubes interconnected in a rectangular arrangement, which are arranged one below the other in two planes and are connected in the corners with respectively vertically directed tubes. The structure is stabilized by means of steel cables, which provide tension in different diagonals, wherein the steel cables are tensioned at corner points of the construction or in the middle of supports.

FIG. 4 to 7 show examples of the production process of a direct mold 1 in greater detail.

Figure 4:
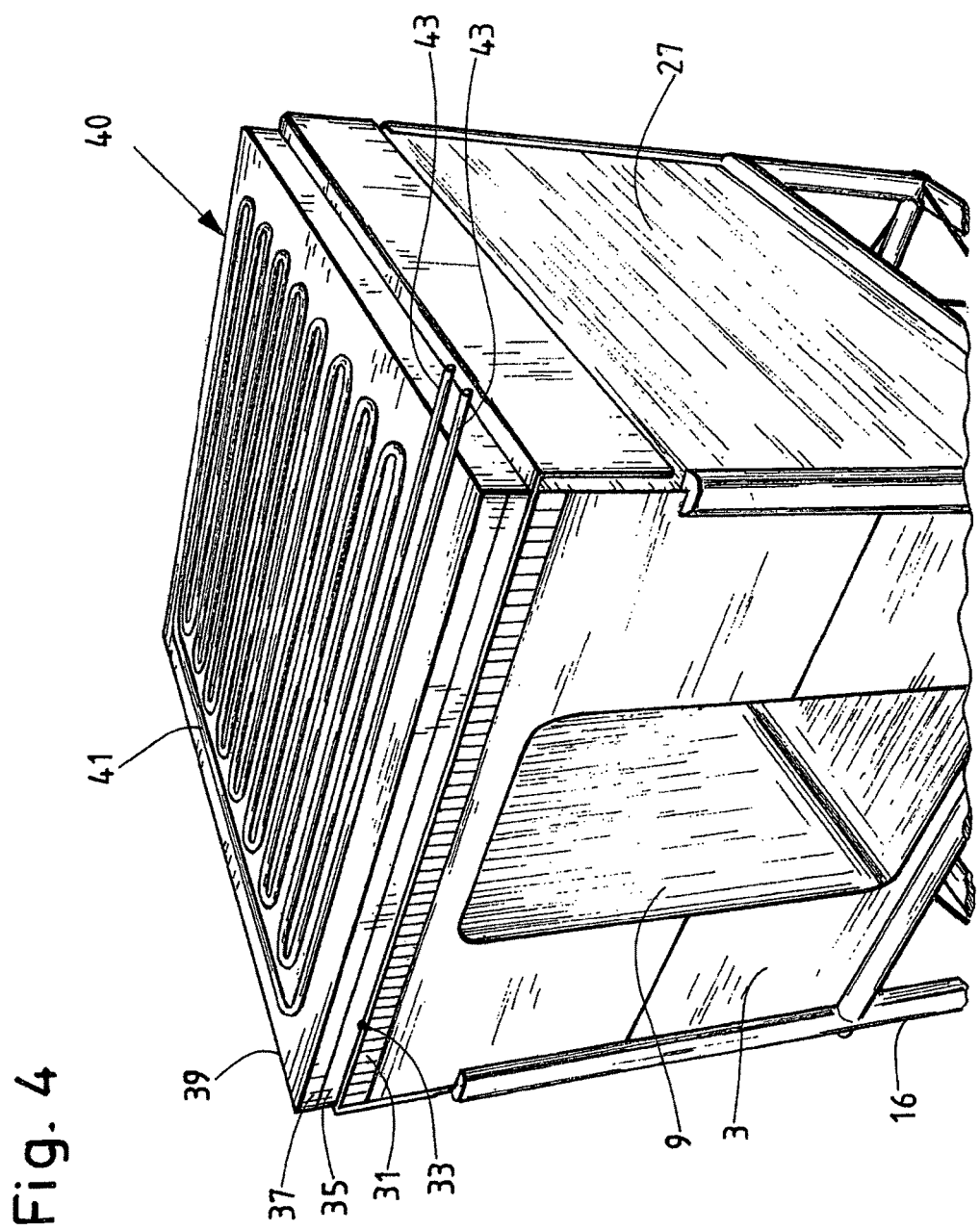
FIG. 4 is a perspective view of a simplified representation of a part of a direct mold according to the invention.
Figure 5:
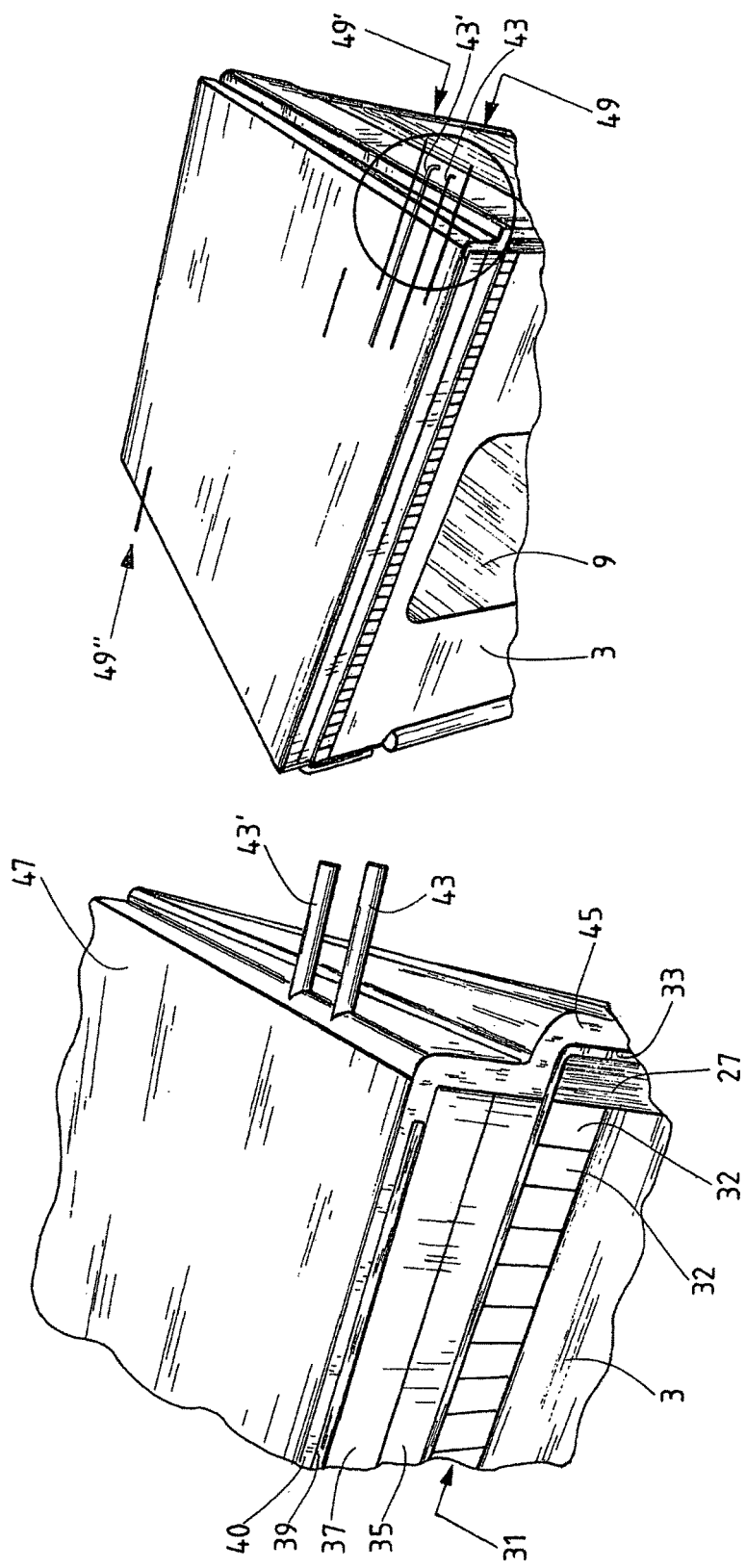
FIG. 5a-5b are perspective views of simplified representations of parts of a direct mold according to the invention.

FIG. 4 shows a very schematized and simplified representation of a partially completed direct mold. For the sake of clarity, a cuboid shaped area is shown, in which the curvature of the surface of the mold was omitted. The layer structure is thus clearer.

In the lower area of FIG. 4, the steel substructure 16 from FIG. 3c is shown, into which the plank frame 2 with panels 3 and a support 9 is embedded. The plank frame is finished laterally by side panels 27 one of which is directly visible in FIG. 4.

A support layer 31 made of elongated rails, which continues the mold specified by the successive panels and their inner contours, is arranged on the top side of the segments panel 3, which consists of six segments in this case. The rails are made of PET, PVC or wood and adjust through bending to the contour specified by the panels 3. The cross-sectional areas of the rails are visible in FIG. 4.

This support layer 31 is laminated over with a first laminate layer 33, which also partially covers the side panels 27 and thus provides cohesion. A first reinforcing layer 35 and a second reinforcing layer 37 are applied to the first laminate layer 33, which provide both thermal insulation as well as reinforcement of the structure. Suitable materials, which have a thermal insulation and a greater moment of inertia than a laminate layer, are for example PET foam, PVC foam or balsa wood. The overall thickness of these two layers is approx. 5 cm. The thickness of the first laminate layer 33 is approx. 5 mm to 10 mm.

A second laminate layer 39 is applied to the surface of the second reinforcing layer 37, which provides thermal protection for the underlying sandwich structure. The second laminate layer 39 is also a good insulator, to which a heater in the form of a heating coil 41 is applied, which can be flowed through, for example, by heated water or heated oil. For this, two connections 43, 43' serve to introduce and to discharge the heating fluid. Instead of a liquid heater like a water heater or an oil heater, electrical heaters, for example a carbon heater with electrically heatable carbon filaments, can also be used. These have the advantage of a low thermal expansion or respectively a thermal expansion which corresponds with the thermal expansion of the surrounding laminate, whereby the laminate structure does not come undone again even in the case of heating.

The coil structure of the heating coil 41 ensures an even distribution of the introduced heat. For example, copper tubes or GRP tubes and GRP wires can be used as hoses. The spaces between the coils of the heating coil are filled with laminate material.

FIG. 5a shows a detail of the layer structure of the direct mold according to the invention in a further production state in cross-section. Here, in particular, the cross-sections of the rails 32 of the support layer 31 can be seen on the panel 3, which is bordered laterally by the side panel 27 and is bordered by the first laminate layer 33.

The already previously shown second laminate layer 39, which provides thermal insulation, is shown in the reinforcing layers 35, 37 built on it, as well as a heatable layer 40 that can be placed on it. The heating coil 41 shown in FIG. 4, the connections 43, 43' of which are shown in FIG. 5a, is embedded into this heatable layer 40. For this, this layer was applied between the coils of the heating coil 41. As the third laminate layer 45, this layer also covers the sides up to the side panel 27.

A heat-conducting wire mesh 47 is applied to the surface of this heatable layer 40, which ensures a further standardization of the heat input. The distance between this wire mesh 47 and the heating coil 41 is approximately 3 mm of laminate material.

The wire mesh can be made, for example, of aluminum or copper. Alternatively, a film can also be provided, which has an oil or a silicon in one or more pockets, which are also heat-conducting.

In addition to the representation in FIG. 5a, FIG. 5b shows that several temperature sensors 49, 49', 49" are arranged at the position of connections 43, 43' and at another position on the opposite-lying side of the heating coils 41 in the heatable layer 40 and measure the temperature in the layer. The first temperature sensor 49 is thereby arranged at the position of the outlet connection 43, the second sensor 49' at the position of the inlet connection 43' and the temperature sensor 49" at a position between the inlet and the outlet in the progression of the heating coil 41. The measurement data from these sensors is used to control the heating.

FIG. 6 in turn shows a detail cross-section through a part of the direct mold according to the invention shortly before completion. In addition to the details already shown in the previous figures, a fourth laminate layer 51 is shown above the heatable layer 40 as well as a cover layer 53 on the fourth laminate layer 51. The cover layer can also be a part of the fourth laminate layer 51. With the fourth laminate layer 51 and the cover layer 53, the heater, i.e. the heating coil 41, is covered to approximately 8 mm to 10 mm with laminate material in this processing state.

Excess laminate material is then milled off again during the production of the contour to be set so that the cover layer 53 can also be understood as a material to be milled off. The material to be milled off has a thickness of 3 mm to 4 mm so that after the milling off the heating coils are covered with approximately 5 mm to 6 mm of laminate material of the laminate layer 51.

FIG. 7 shows that a paint layer 55 is applied to the sandwich structure and laminate structure after the milling and grinding off, which forms the end of the mold. It is preferably an even coating that is very smooth. A separation of the inlaid laminate material of the rotor blade to be produced from this surface generally takes places through the addition of chemicals. Suitable materials for the paint layer 55 are, for example, polyurethane, vinylester, polyester, epoxy or epoxy resin, a PTFE paint, which is self-separating, or a paint which comprises ceramic additives or additive systems.

The direct mold, which is produced or respectively used in so-called direct tooling process, enables a time savings for the first molding of up to 50% as well as considerable cost savings. A master model does not need to be produced and stored. Different parts of the direct mold can be produced simultaneously or respectively in parallel, which leads to time savings, since these direct mold segments can later be interconnected. The possibility of a modular design results, which is simultaneously lightweight and rigid.

The direct mold can also easily be transported for large rotor blades because it can be subdivided into smaller parts.

Furthermore, the use of direct molds enables the development of rotor blades in-situ both with respect to material as well as shape.

All named features, including those taken from the drawings alone, and individual features, which are disclosed in combination with other features, are considered individually and in combination as essential to the invention. Embodiments according to the invention can be realized by individual features, or a combination of several features.

LIST OF REFERENCES

1 Direct mold
2 Plank frame
3 Panel
5-5''' Panel segment
7-7'' Recess
9-9'' Support
11 Inner contour of a panel
13 Foundation
15, 16 Steel substructure
21 Mold surface body
23 Layer structure
25 Coating of paint
27 Side panel
31 Support layer
32 Rail
33 First laminate layer
35 First reinforcing layer
37 Second reinforcing layer
39 Second laminate layer
40 Heatable layer
41 Heating coil
43, 43' Connections of the heating coil
45 Third laminate layer
47 Heat-conducting wire mesh
49-49'' Temperature sensor
51 Fourth laminate layer
53 Cover layer
55 Paint layer

What is claimed is:

1. A direct mold for molding at least a part of a rotor blade of a wind turbine, the direct mold comprising:
   a plank frame, wherein the plank frame is made of a plurality of planar panels, which are aligned transversely to a longitudinal extension of the part of the rotor blade to be molded, and are arranged a spaced apart distance with respect to each other one after another in a direction of the longitudinal extension of the part of the rotor blade to be molded; and
   a mold surface body held in shape by the plank frame, wherein the plurality of panels of the plank frame each have an inner contour on which the mold surface body is supported,
   wherein the plurality of panels reproduce in their sequence in the plank frame mainly a progression of a contour of the part of the rotor blade to be molded,
   wherein the mold surface body has a layer structure, which comprises a support layer and a sandwich layer,
   wherein the support layer is made of rails, which are aligned in the direction of the longitudinal extension of the part of the rotor blade to be molded in a manner bridging the spaced apart distance between the panels,
   wherein the sandwich layer is arranged on the support layer and comprises a multilayer laminate structure, a surface of which is at least one of milled and painted and has the contour of the part of the rotor blade to be molded,
   wherein each of the plurality of panels is reinforced with at least one hollow carbon support beam, which is separate and distinct from the mold surface body, and which is received within a recess, said at least one hollow carbon support beam extending in the direction of the longitudinal extension of the part of the rotor blade to be molded and forming part of a backbone of the plank frame,
   wherein each of the plurality of panels is a composite-sandwich panel,
   wherein each of the plurality of panels comprises interconnected panel segments, and
   wherein each of the plurality of panels is segmented in such a manner that the at least one hollow carbon support beam is inlayable into the recess before the panel segments are interconnected.

2. The direct mold according to claim 1, wherein the direct mold is arranged in a steel substructure.

3. The direct mold according to claim 1, wherein the sandwich layer only has a direct adhesive connection in a root area of the part of rotor blade to be molded.

4. The direct mold according to claim 1, wherein a near-surface layer of the laminate structure is adapted to be heated so as to define a heatable layer, and wherein the heatable layer is heated with at least one of heating elements of a water heater laminated into the heatable layer, a carbon heater with carbon filaments, and an electrical heater.

5. The direct mold according to claim 4, wherein a heat-conducting structure that includes at least one of a wire mesh and temperature sensors is embedded into the heatable layer of the laminate structure.

6. The direct mold according to claim 4, wherein a heat-conducting structure that includes at least one of a wire mesh and temperature sensors is applied on the heatable layer of the laminate structure.

7. The direct mold according to claim 1, wherein the sandwich layer has at least one reinforcing layer that includes at least one of PET foam, PVC foam, and balsa wood.

8. The direct mold according to claim 1, wherein the surface of the mold surface body is painted with a paint layer comprising at least one of polyurethane, vinylester, polyester, epoxy resin, PTFE, and ceramic additives.

9. The direct mold according to claim 1, wherein the direct mold is assembled from several direct mold segments.

10. The direct mold according to claim 1, wherein
   a total of three hollow carbon support beams are each inlayed in separate recesses in each panel of the plank frame.

11. The direct mold according to claim 10, wherein a first and a second of the three hollow carbon support beams are smaller than a third of the three hollow carbon support beams.

12. The direct mold according to claim 11, wherein the first and the second of the three hollow carbon support beams are arranged to provide lateral reinforcement in an area of a leading edge and an area of a trailing edge, respectively, of a profile of the part of the rotor blade to be molded.

* * * * *